United States Patent [19]
Nelson

[11] 3,929,623
[45] Dec. 30, 1975

[54] LEAD/CHLORIDE/ALUMINA ISOMERIZATION CATALYST FOR GASOLINE

[75] Inventor: William T. Nelson, Bartlesville, Okla.

[73] Assignee: Phillips Petroleum Company, Bartlesville, Okla.

[22] Filed: Nov. 25, 1974

[21] Appl. No.: 526,940

[52] U.S. Cl. ................. 208/135; 208/139; 252/441
[51] Int. Cl.² ..................... C10G 35/06; B01J 27/06
[58] Field of Search ............ 208/135, 139; 252/441

[56] References Cited
UNITED STATES PATENTS

| | | | |
|---|---|---|---|
| 2,939,896 | 1/1960 | Myers et al. | 260/680.68 |
| 2,981,696 | 4/1961 | Hervert et al. | 252/441 |
| 3,227,658 | 1/1966 | Myers et al. | 252/443 |
| 3,666,412 | 5/1972 | Sowards | 423/162 |
| 3,692,863 | 9/1973 | Kmecak | 260/683.3 |
| 3,711,425 | 1/1973 | Suggitt et al. | 252/439 |

*Primary Examiner*—Delbert E. Gantz
*Assistant Examiner*—Juanita M. Nelson

[57] ABSTRACT

A heavy gasoline fraction having a relatively low research octane number as for instance a fraction obtained from a cat cracker gasoline is passed over a chlorided alumina catalyst modified by the addition of 0.01 to 5 weight per cent lead calculated as PbO. The presence of lead decreases the cracking activity of the catalyst so that it can be operated at a higher temperature which favors increased formation of aromatic hydrocarbons.

8 Claims, No Drawings

LEAD/CHLORIDE/ALUMINA ISOMERIZATION CATALYST FOR GASOLINE

BACKGROUND OF THE INVENTION

This invention relates to a hydrocarbon reforming process utilizing a lead/chloride/alumina catalyst.

It has long been known to use an alumina base containing platinum and a halogen for the reforming of gasoline fractions such as the higher boiling part of the straight run gasoline contained naturally in crude oil and the heavy gasoline fraction boiling between about 180 to 400° F in a full range gasoline produced by catcracking. These materials inherently have a research octane number (RON) clear of less than about 90 and must be reformed to produce a product having a higher RON by increasing the aromatic content of the reformate. One of the factors which has limited the use of catalytic reforming has been the excessive formation of light gases such as methane, ethane, propane, ethylene, propylene and butenes. Thus there is a need for an inexpensive catalyst system which is effective in producing large amounts of aromatics so as to raise the RON without significant formation of light gases. Hydrogenation-dehydrogenation catalysts, for example, are undesirable since in the presence of hydrogen they would cause hydrogenation of the olefins contained in the gasoline to paraffins thus resulting in the production of gasoline having lowered RON values rather than higher values.

SUMMARY OF THE INVENTION

It is an object of this invention to provide an improved catalyst for reforming relatively low octane gasoline fractions;

it is a further object of this invention to provide an improved isomerization process to produce relatively high octane gasoline;

it is yet a further object of this invention to provide an inexpensive catalyst which is effective in producing high octane products; and it is still yet a further object of this invention to avoid the production of large amounts of light gases.

In accordance with this invention a relatively low octane gasoline fraction is passed over a catalyst consisting essentially of a chlorided alumina base modified by the addition of 0.01 to 5 weight per cent lead calculated as PbO based on the weight of said catalyst.

DESCRIPTION OF THE PREFERRED EMBODIMENTS

The base for use in the catalysts of this invention can be any active alumina of the type known in the art. The preferred material is gamma-alumina having a specific surface area of from 100 to 500 square meters per gram, a specific pore volume of about 0.1 to 1 cc per gram, and an apparent bulk density of about 0.6 to 1 grams per cc. Other suitable aluminas include eta and theta alumina. Small quantities (up to about 0.5 weight per cent) of other refractory inorganic oxides such as silica, magnesia, zirconia, etc. may also be present in admixture with the alumina as well as lesser amounts (i.e., about 0.1 weight per cent or less) of such metals (as the oxide) as iron, sodium, and calcium. In addition, minor quantities of sulfur, ranging from about 0.5 to 4 weight per cent (calculated as $SO_3$) may also be present.

The alumina must be chlorided preferably by treating with aqueous solutions of HCl so as to give chlorine in an amount within the range of 0.1 to 5 weight per cent calculated as hydrogen chloride based on the weight of the catalyst. Gaseous HCl or ammonium chloride can also be used.

The third component of the catalyst system is lead which is present in an amount within the range of 0.01 to 5 weight per cent of lead calculated as PbO based on the weight of catalyst. The lead can be added to the chlorided support, for example, in the form of any convenient salt which is thereafter converted to PbO by heating in air, for example. Water soluble salts of lead in the plus two valence state such as lead nitrate and lead acetate are preferred.

The catalyst of this invention represents a different class of catalysts from the platinum-containing catalysts of the prior art. In addition with this distinct new class of catalyst of this invention, it is essential that the halogen be a chloride. Accordingly, the catalyst is described as consisting essentially of the alumina base, the chloride, and the lead so as to define this distinction from the prior art catalyst systems containing a platinum group metal either alone or with a fluoride.

The hydrocarbons used in the process of this invention comprise olefins, paraffins and naphthenes which are usually present in thermally and catalytically cracked gasolines. The gasolines are substantially olefinic in nature and generally contain at least 25 volume per cent olefin and frequently contain 40 per cent or more olefins. The gasoline can be a full boiling range material having an initial ASTM boiling range between about 60°F and about 100°F and an end point between about 250°F and about 450°F or it can be a narrow fraction selected from within this boiling range. It is presently preferred to use such a narrow fraction within this range which has an initial boiling point between about 160°F and about 200°F with an end point between about 375°F and about 425°F.

The catalyst can be calcined prior to use by heating in air at 600° to 1200°F, preferably 850°–1000°F for 0.1 to 50 preferably 1 to 5 hours or an oxygen-containing gas such as air can be passed over the catalyst while it is in the reactor as the reactor is being brought up to temperature thus eliminating the necessity for a separate calcination step.

The operating conditions used in the process of this invention are varied but are such that the octane rating of the gasoline is substantially improved. Temperatures between about 600°F and about 1200°F, more preferably about 800°F to about 1100°F, most preferably 900° to 1050°F are employed. Within these temperature ranges, liquid hourly space velocities ranging from about 0.1 to about 20, more preferably from about 1 to about 6 are used. Pressures in the isomerization zone range from about 0 to 100 psig. If hydrogen is used the hydrocarbon-hydrogen mole ratio will range from about 0.25 to 10.

Maintenance of catalyst activity during use in this process can be aided, if desired, by including 0.001 to about 1 weight per cent chloride in the feed in the form of chlorinated hydrocarbons such as carbon tetrachloride, chloroform, ethyl chloride, etc.

EXAMPLE 1

The chlorided alumina catalyst used as the control was prepared by crushing a commercially obtained gamma-alumina in the form of ⅛-inch extrudate and screening the material to obtain 10–20 mesh particles. The particles were dried at 215°F for 7 hours in an air oven and to 63.8 g of the cooled dried product was added 31.9 g of 2 weight per cent hydrochloric acid solution. The liquid was just taken up by the solid. The resulting mixture was dried for 4 hours at 210°–240°F and then allowed to cool overnight at room temperature in a vacuum desiccator. The calculated amount of chloride impregnated on the catalyst was 0.96 weight per cent calculated as HCl and based on the total weight of the catalyst.

The lead-promoted catalyst of this invention was prepared by impregnating 19.1 grams of the chlorided alumina with 0.600 grams of $Pb(C_2H_3O_2)_2.3H_2O$ dissolved in 10 cc of water. The resulting mixture was dried at 215°F for 3 hours. The amount of lead, calculated as PbO, impregnated on the catalyst was 1.94 weight per cent based on the total weight of the catalyst.

Each of the catalysts (about 14–15 grams) was individually charged to a reactor at room temperature and the reactor was brought up to operating temperature while nitrogen was passed through the apparatus in the control runs and nitrogen plus 1 volume per cent oxygen in the invention runs to convert any remaining lead acetate to lead monoxide.

The feed for the runs used in the process of this invention was obtained by fractionating a caustic-washed but not inhibited Kansas City cat cracked full range gasoline to obtain a heavy fraction with a boiling point range from 167°F to 407°F. The full range gasoline had an API gravity of 59.0, a research octane number (RON) clear of 92.3 and a motor octane number (MON) clear of 80.5. The olefin content was approximately 50 LV per cent. The heavy fraction obtained had an API gravity of 49.1, RON (clear) of 89.2, a MON (clear) of 79.3 and it consisted of about 63 liquid volume per cent of the starting material. The light unused fraction had an API gravity of 80.3, RON (clear) of 95.3 and MON (clear) of 81.6.

The heavy gasoline fraction was isomerized at several temperatures to illustrate the utility of the lead-promoted catalyst in comparison with the unleaded control catalyst. Analyses of products was made using gas-liquid chromatography. The operating conditions employed and the results obtained are presented in Table 1.

value obtained by multiplying the RON by the weight fraction yield of liquid product is decreasing. Contrasting with these results are those obtained using the lead oxide-promoted chlorided alumnia catalyst of the invention. It is clearly seen at temperatures as much as 200°F higher than the best results obtained with the control catalyst operating at 800°F that the invention catalyst is suppressing the formation of cracked gases, thus the yields of the desired product remain higher than those obtained with the control catalyst. Moreover, the RON values of the products, even at 250°F above the best operating temperature of the control catalyst, are higher than the control values. The relative rating values are also significantly higher than the control up to 1000°F reactor temperature and about equal at 1050°F compared to the best control operating at 800°F.

In a subsequent operation, the fraction upgraded by isomerization is blended with the light fraction to obtain a full range gasoline with a higher RON (clear) rating compared to the untreated gasoline.

While this invention has been described in detail for the purpose of illustration, it is not to be construed as limited thereby but is intended to cover all changes and modifications within the spirit and scope thereof.

I claim:

1. A process for reforming a gasoline comprising passing said gasoline into contact with a catalyst consisting essentially of
   1. an alumina base;
   2. chlorine in an amount within the range of 0.1 to 5 weight per cent calculated as hydrogen chloride based on the weight of said catalyst; and
   3. 0.01 to 5 weight per cent lead calculated as PbO based on the weight of said catalyst
   at a temperature within the range of 600° to 1200°F; and
   recovering a product having a higher octane rating.

2. A process according to claim 1 wherein said base is gamma-alumina.

3. A method according to claim 1 wherein said chlorine is imparted by contacting said alumina with a hydrochloric acid solution.

4. A method according to claim 1 wherein said lead is introduced by impregnating said base with a solution of a lead compound and thereafter contacting said thus impregnated base with air at an elevated temperature Table 1

| | Catalyst | | | | | |
|---|---|---|---|---|---|---|
| | Chlorided Alumina | | | Lead Oxide/Chlorided alumina | | |
| Run No | 1 | 2 | 3 | 4 | 5 | 6 |
| Reactor Temp. °F | 800 | 850 | 900 | 950 | 1000 | 1050 |
| Run Length, Hrs. | 4 | 4 | 5 | 5 | 5 | 5 |
| Space Rate (vol/vol/hr) | 2.93 | 2.95 | 3.05 | 3.01 | 3.03 | 3.04 |
| Yields, Wt. % | | | | | | |
| Gas | 4.39 | 5.28 | 2.08 | 3.37 | 3.80 | 5.99 |
| $C_5$+ liquid | 95.3 | 94.4 | 97.6 | 96.3 | 95.8 | 93.8 |
| Coke | 0.28 | 0.30 | 0.33 | 0.34 | 0.43 | 0.16 |
| Octane Ratings of $C_5$+ liquid | | | | | | |
| RON (clear) | 92.0 | 91.4 | 92.6 | 92.3 | 92.4 | 93.2 |
| MON (clear) | 81.4 | 80.9 | 80.6 | 80.0 | 80.6 | 80.7 |
| Octane No. (RON) × Wt. Fraction Yield | 87.7 | 86.3 | 90.4 | 88.9 | 88.5 | 87.4 |

Inspection of the results shows that with a chlorided alumina catalyst, production of cracked material becomes objectionably high at a reactor temperature of about 850 the yield of liquid product is decreasing, the RON (clear) value is decreasing and a relative rating to oxidize the lead compound to said PbO.

5. A method according to claim 1 wherein said temperature is within the range of 800° to 1100°F.

6. A method according to claim 1 wherein said temperature is within the range of 900° to 1050°F.

7. A method according to claim 1 wherein said gasoline is relatively low octane gasoline from a cracking operation.

8. A method according to claim 7 wherein said alumina is gamma-alumina, said chlorine is imparted by contacting said alumina with a hydrochloric acid solution, said temperature is within the range of 900° to 1050°F and said gasoline is cat cracked gasoline having a research octane number of no more than 90.

* * * * *